(12) United States Patent
Soper et al.

(10) Patent No.: US 6,811,265 B2
(45) Date of Patent: Nov. 2, 2004

(54) RETRACTABLE IMAGE PROJECTING SYSTEM

(76) Inventors: Kevin James Soper, 2 Doradus Avenue, Hope Valley, S.A. 5090 (AU); Philip Brendan Banks, 16 Araidne Crescent, Modbury Heights, S.A. 5092 (AU)

( * ) Notice: Subject to any disclaimer, the term of this patent is extended or adjusted under 35 U.S.C. 154(b) by 30 days.

(21) Appl. No.: 10/181,016

(22) PCT Filed: Jan. 12, 2000

(86) PCT No.: PCT/AU01/00023

§ 371 (c)(1),
(2), (4) Date: Nov. 4, 2002

(87) PCT Pub. No.: WO01/51989

PCT Pub. Date: Jul. 19, 2001

(65) Prior Publication Data

US 2003/0160947 A1 Aug. 28, 2003

(30) Foreign Application Priority Data

Jan. 13, 2000 (AU) ............................................. PQ 5108

(51) Int. Cl.[7] ..................... G03B 21/28; G03B 23/06; G03B 21/14; G03B 21/22; G02F 1/1335
(52) U.S. Cl. ............................. 353/99; 353/73; 353/78; 353/107; 353/117; 353/119; 349/6
(58) Field of Search ........................ 353/99, 107, 103, 353/119, 117, 74, 77, 78, 73; 349/5, 6, 7, 8, 58

(56) References Cited

U.S. PATENT DOCUMENTS

| | | | |
|---|---|---|---|
| 3,904,289 A | 9/1975 | Yager | 353/122 |
| 3,940,209 A | 2/1976 | Portner et al. | 353/79 |
| 4,013,353 A | 3/1977 | Portner et al. | 353/99 |
| 4,048,653 A | 9/1977 | Spooner | 358/104 |
| 5,123,728 A | 6/1992 | Gradin et al. | 353/78 |
| 5,453,803 A | 9/1995 | Shapiro et al. | 353/119 |
| 5,457,575 A | 10/1995 | Groves et al. | 359/631 |
| 5,622,419 A | 4/1997 | Holder et al. | 353/119 |
| 5,639,152 A | 6/1997 | Nelson | 353/119 |
| 6,149,253 A * | 11/2000 | Talasani | 312/7.2 |
| 6,231,191 B1 * | 5/2001 | Shiraishi et al. | 353/61 |
| 6,256,078 B1 * | 7/2001 | Ogata | 349/58 |
| 6,379,012 B1 * | 4/2002 | Enochs et al. | 353/79 |
| 6,491,398 B2 * | 12/2002 | Takeuchi et al. | 353/31 |

* cited by examiner

Primary Examiner—Rodney Fuller
Assistant Examiner—Melissa J Koval (57) ABSTRACT

An image projecting system for mounting in a hidden location such as a ceiling or a piece of furniture such as a desk. The system includes an image producing apparatus and a plurality of optical components. At least one of the optical components is a mirror that can move between two positions. In the first position the mirror is flush with the ceiling or the desk so that the system is hidden from view. In the second position the mirror is at an angle to the ceiling or the desk so as to project an image externally of the hidden location and onto a screen or other surface.

4 Claims, 8 Drawing Sheets

RETRACTABLE IMAGE PROJECTING SYSTEM

The present invention relates to a retractable image projecting system mounted in a hidden location and in particular to a system that includes optical components to project an image from said location and wherein those optical components can be retracted so as to not extend beyond said location to thereby minimise or reduce any physical obstruction.

BACKGROUND OF THE INVENTION

Image projecting systems such as slide or video projectors are now commonplace in businesses and homes. Generally these systems include a body containing an optical engine and which projects an image onto a surface such as a screen. The body is generally placed on and supported by a bench, desk or trolley when in use. Not only is this unsightly, with various electrical cords also being needed, but it occupies space which could otherwise be used or other purposes.

Some image projecting systems are mounted by hanging them from the ceiling, but these are also unsightly and obtrusive and only useful in areas where there is sufficient ceiling height for them to be mounted. These are also expensive and generally custom made and are not made from existing image projectors.

The applicant is not aware of any projection system that may be conveniently stored in a location where it is hidden or does not obstruct a work area and that may be easily operated for use when required.

It is an object of the present invention to overcome at least some of the abovementioned problems or to provide the public with a useful alternative by providing for a projection system wherein when not in use the projection system is conveniently mounted in a location where it does not provide an obstruction to other uses.

BRIEF SUMMARY OF THE INVENTION

Therefore in one form of the invention there is proposed an image projecting system for mounting in an enclosed space including:
 a image producing apparatus adapted to be mounted in a hidden location and adapted to project an image onto a first mirror, said first mirror reflecting said image onto a second mirror;
 said second mirror being operatively movable between at least two positions, in a first position substantially reflecting said image to a first location and in a second position reflecting said image to a second location.

Advantageously when in said first position the second mirror reflects the image substantially back to the first mirror.

Advantageously when in said second position said second mirror reflects the image out of said enclosed space back to the first mirror and in the second reflecting it out of said enclosed location.

An image projecting system as in any one of the above claims wherein said system is adapted to be mounted within a ceiling space.

Advantageously said system is adapted to be mounted within office furniture.

Advantageously said system further includes optical components to optically affect said image. For example, polarisers and filters including heat and ultra violet filters may be used. Alternatively optical components for focussing and defocusing the image may be used.

In preference said second mirror is pivotable with respect to the first mirror.

In preference when in the first position the second mirror is folded to be substantially parallel to the projection apparatus.

In preference the image projection apparatus is a typical slide projector and where the image is produce by the use of a liquid crystal display screen.

In preference the second mirror is movable by the use of an electric motor.

In preference the system further includes a telescope inter-disposed between the first and the second mirrors to enable the image to be transmitted over a pre-determined distance.

In preference said telescope is mechanically extendible.

Preferably the back of said second mirror is adapted to visually blend in with its surround. In a further form of the invention there is proposed an image projecting system for mounting in a hidden location including an image producing apparatus for producing an image and a plurality of optical components for projecting said image out of said hidden location wherein when in use at least a first optical component extends beyond said hidden location and when not in use all of said optical components are stored within said hidden location to thereby house said system in said hidden location and hide it from view.

Advantageously said hidden location is a ceiling space.

Advantageously said hidden location is within a piece of furniture.

Advantageously said optical component is a mirror used to project the image out of said hidden location.

Preferably said hidden location is defined at least in part by a wall, said mirror forming a part of said wall wherein in a first position the mirror is generally flush with the wall and in a second position is at a predetermined angle to the wall to thereby project the image out of said location.

Preferably said mirror is both pivotable and rotatable with respect to the image projecting apparatus.

In a still further form of the invention there is proposed an image projecting system for re-directing an image and including at least two mirrors wherein the second mirror is movable with respect to the first mirror between at least two positions, in the first position substantially reflecting said image back to the first mirror and in the second reflecting it onto a screen.

In preference said system is adapted to be mounted in an enclosed space, the second mirror adapted to be pivotable out of said space to thereby reflect said image out of said space.

Preferably, said system further includes a plurality of optical lenses to optically effect said image.

In preference said second mirror is pivotable with respect to the first.

In preference said image projecting system is adapted to be mounted in ceiling space, the second mirror in the first position lying substantially parallel to the surface of said ceiling. Preferably said image-projecting system is adapted to be mounted within a piece of furniture, with the second mirror in the first position being substantially parallel to the surface of said furniture.

Other objects and advantages of the present invention will become apparent in view of the following detailed description and accompanying drawings.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

Referring to FIGS. 1–7 there is shown a portion of a retractable projection system according to a first embodiment of the invention. FIGS. 2–5 show the system in a retracted or closed position and FIGS. 1, 6 and 7 in the open position The projection system includes an apparatus 10 having frame 12 on which is fixedly mounted a first mirror housing 14 of a pyramidal shape and that supports mirror 16 in an angular position to the frame. The housing 14 includes an aperture 18 that allows light to be directed to the mirror 16. The angular orientation of the mirror is chosen so as to allow the light to then be reflected from mirror 16 through frame 12 to a second mirror 20 supported on a plate 22 rotatably attached to frame 12. Typically the first mirror 16 is at an angle of some 45 degrees to the frame so that light illuminating said mirror 16 is generally parallel to the frame 12 and when reflected pass through the frame.

The plate 22 and thus the second mirror 20 is rotatable from a closed or retractable position in which it is substantially parallel to the frame in which case any light is reflected back through the frame or at some angular or open position that results in the light being reflected out of the frame.

The plate 22 is rotatable typically by mechanical means such as by a cord 24 engaging a pulley 26 fixedly attached to plate 22. The pulley is positioned behind pivot point 28 of the plate so that as the cord is pulled, it causes the plate to open or rotate away from the frame. A spring 30 provides the biasing force and ensures that in the rest position when there is no force on the cord, the plate is caused to be biased in the closed position where it generally abuts the frame.

To rotate or open the plate and thus mirror 20 an electric motor 32 may provide the necessary motion to pull the cord. Obviously the strength of the motor has to be chosen to overcome the biasing force that exceeds that of the spring. An adjustable limit switch 34 may be used to turn the motor off when the plate has been rotated through a desired angle. The spring biasing is such that it provides sufficient force to hold the plate against the frame when in the closed position. This is only one way that the plate can be opened and closed. Other variations may equally well be employed including using a dedicated motor that opens and closes the plate and includes locking means that locks the plate in position. The plate or flap may also be movable by a solenoid where detents at the end of the movement may hold the mirror in place. A counterweight would assist in this regard and manual latching/unlatching would be an option. The plate may also be movable by a worm gear or a lead-screw arrangement.

The second mirror may also be positioned in a retractable tube that may be movable by rack and pinion gearing and also movable by a solenoid or lead-screw arrangement.

The frame may also support control different control electronics 36 for the operation of the motor and other electronic equipment. The electronics may include the power supply, switching for the motor drive, remote control transmitters and receivers if the unit is to be controlled via remote control as well as photo pick up options. Mounting screws 38 located at the corners of the frame enable the frame to be mounted to a desired location.

Figure 1:
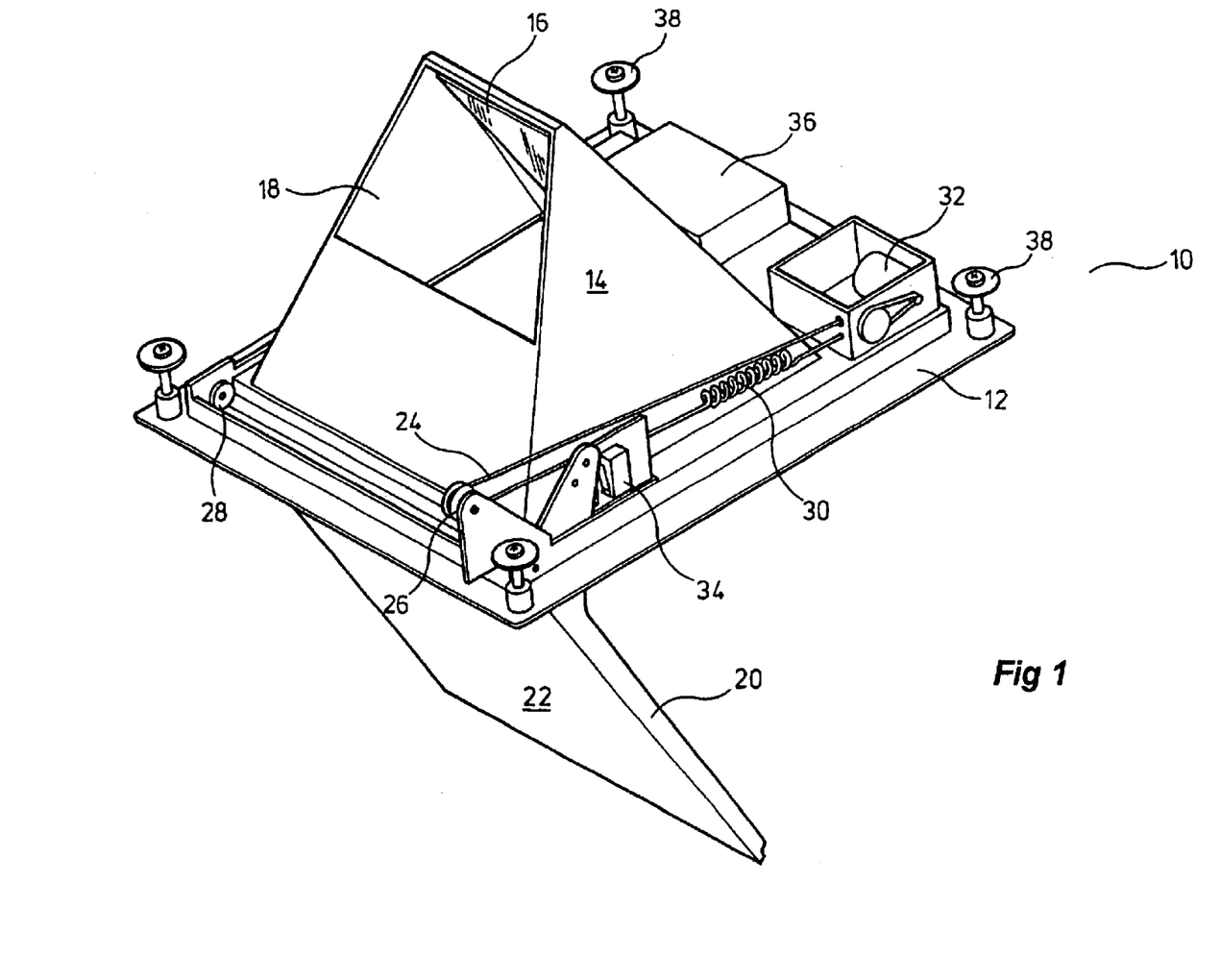
FIG. 1 is a perspective view of the projection system not including a projection generating apparatus when in an operative position according to a first embodiment of the invention.
Figure 2:
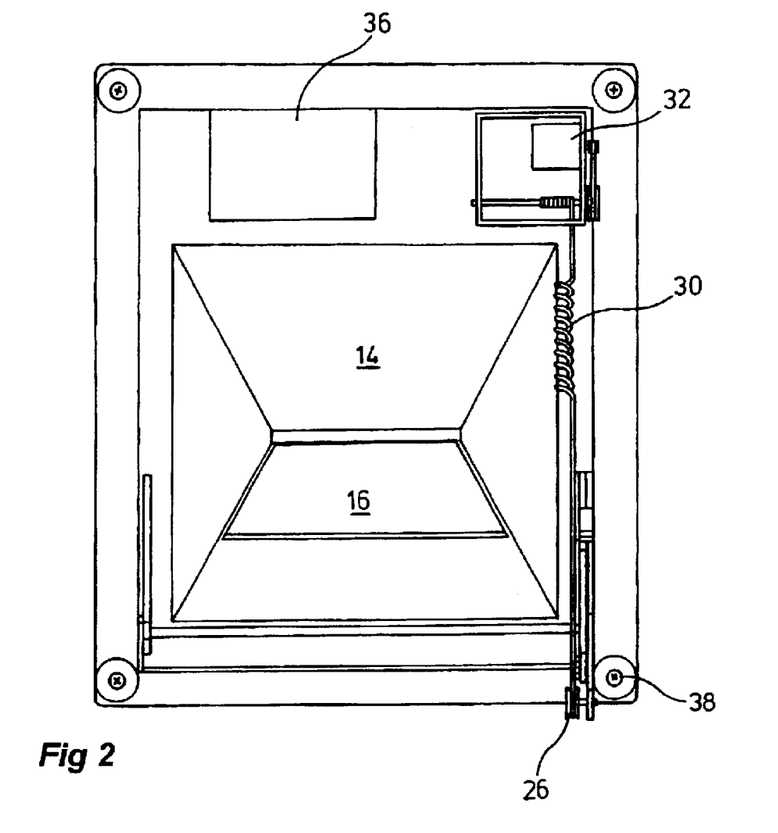
FIG. 2 is a top view of the projection system of FIG. 1 when in a retracted position.
Figure 3:
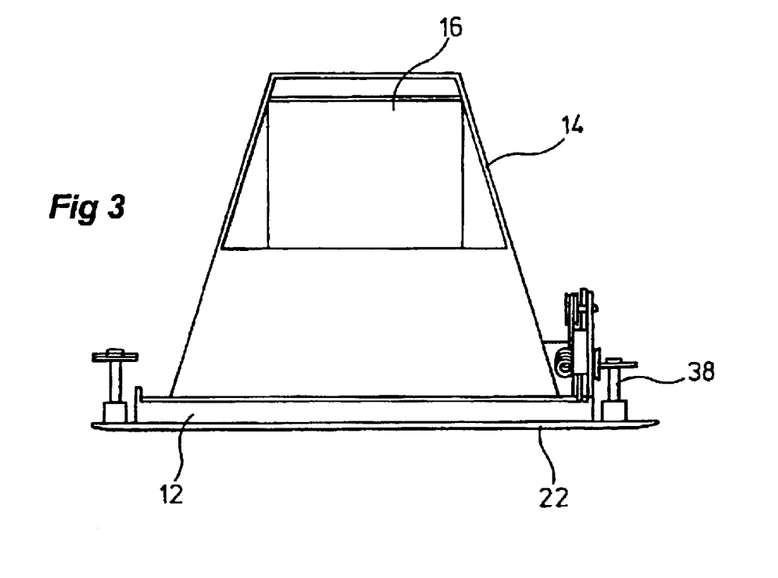
FIG. 3 is an end view of the projection system of FIG. 1 when in a retracted position.
Figure 4:
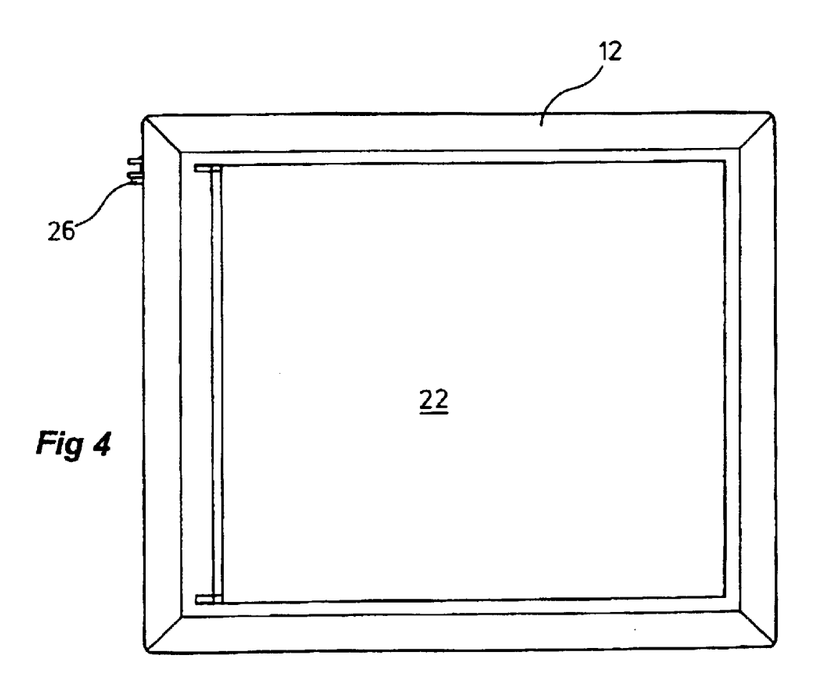
FIG. 4 is a bottom view of the projection system of FIG. 1 when in a retracted position.
Figure 5:
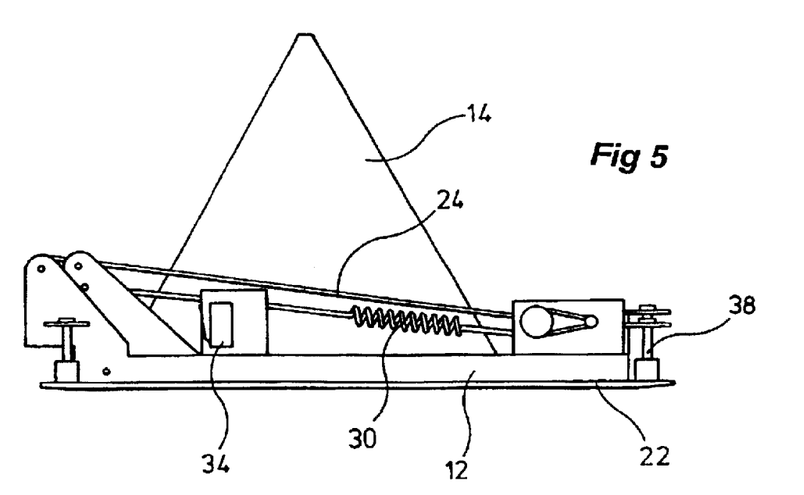
FIG. 5 is a side view of the projection system of FIG. 1 when in a retracted position.
Figure 6:
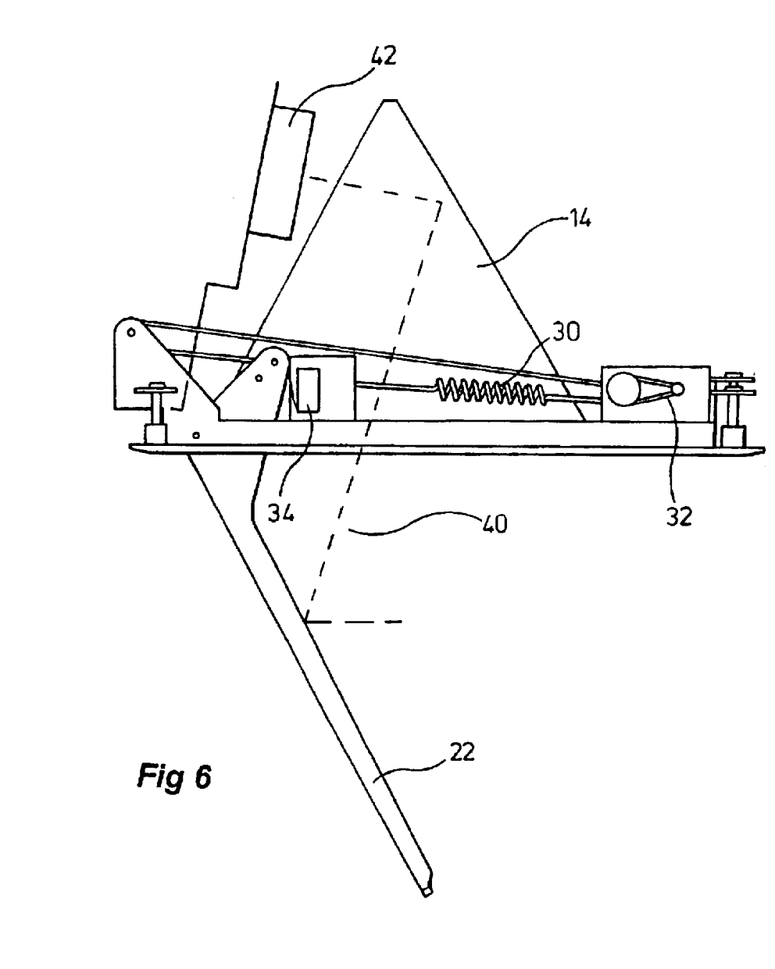
FIG. 6 is a side view of the projection system of FIG. 1 when in an operative position.
Figure 7:
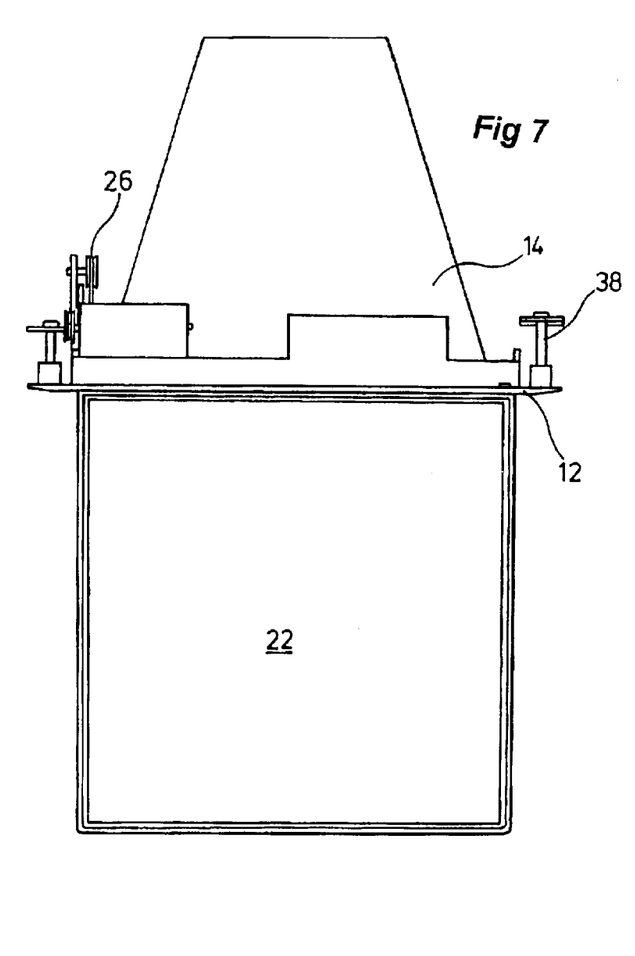
FIG. 7 is an end view of the projection system of FIG. 1 when in an operative position.

Thus in the open position image 40 illuminates first mirror 14 is reflected to second mirror 22 to be projected to a suitable viewing surface. The apparatus may therefore be mounted in a desk or the ceiling together with a suitable image producing apparatus 42 such as a slide projector using a LCD to produce an image.

This first embodiment used the structure of two mirrors that are positioned spatially apart and where one mirror reflected an image to another mirror that is closable and that in the open position then projects that image onto a screen. By such a periscope action the original image producing apparatus may be unobtrusively located away from the final mirror, such as the ceiling or desk space.

Figure 8:
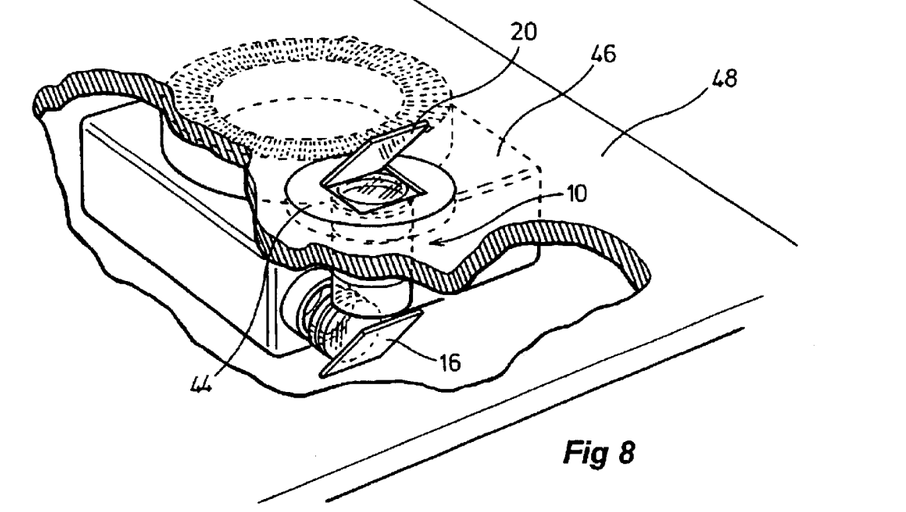
FIG. 8 is a perspective view of the projection system according to a second embodiment of the invention and when mounted in a desk.
Figure 9:
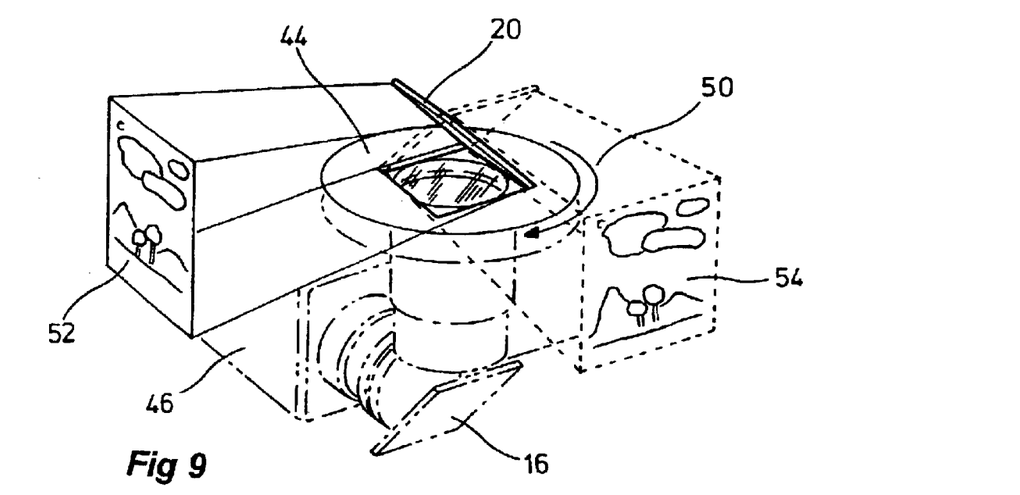
FIG. 9 is a partial perspective view of the projection system of FIG. 8 further including rotative image capability.
Figure 10:
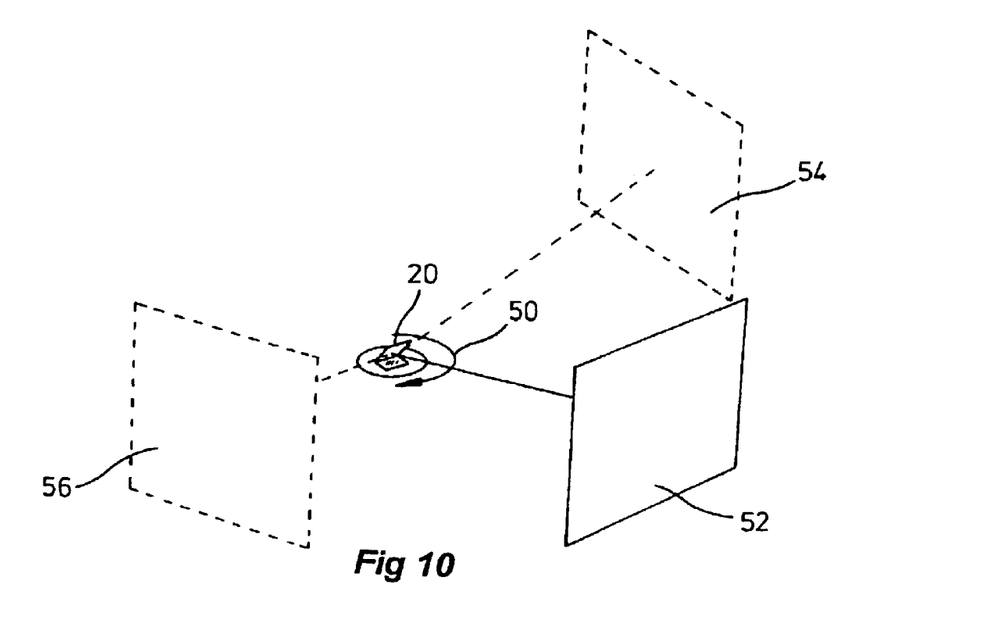
FIG. 10 is a schematic diagram exhibiting the rotative capabilities of the system of FIG. 9.

In a second embodiment of the present invention shown in FIGS. 8–10, there is further shown an invention where the second mirror is not only pivotable but is also rotatable, allowing the final image to be projected to different locations for example, around a room. In this embodiment, the second mirror is mounted on a rotatable turn-style 44 whose rotation controls where the image will be displayed. Although not shown, it is to be understood that to the person skilled in the art, the control of the particular angle is available using well known engineering techniques.

Accordingly a slide projector 46 is located within desk 48 and projects an image onto first mirror 16 that then reflects that image through the apparatus 10 to second mirror 16. Thus by rotating the second mirror through angle 50, the image is displayed in location 52 rather than 54 or it may even be displayed in location 56. It is to be understood that the image projection apparatus may equally well be a video projector, such as that using and LCD to project an image, and is not intended to be limited to a slide projector. Furthermore, using optical engines, it may be that the image can be projected into two directions simultaneously (not shown).

Figure 11:
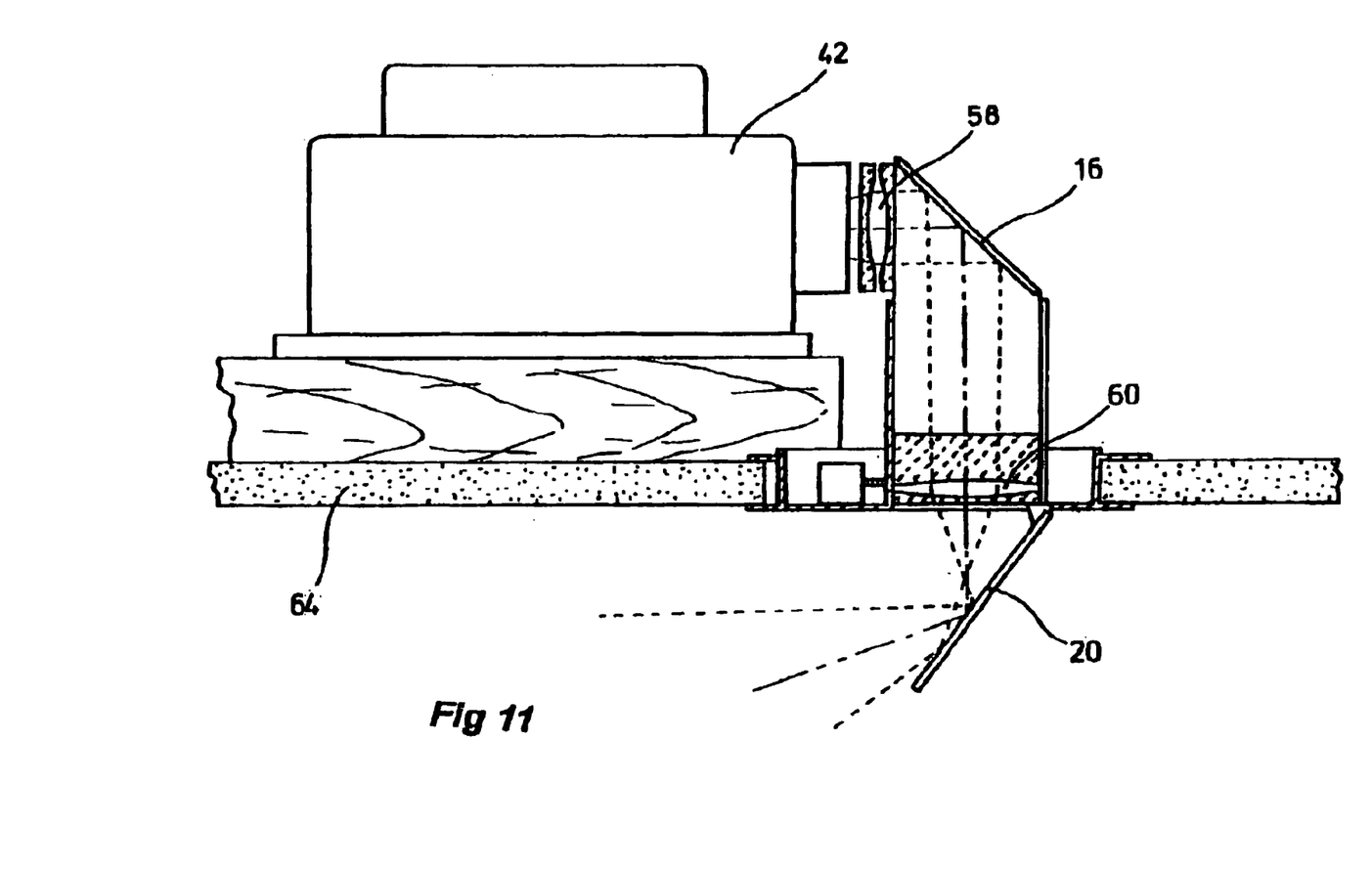
FIG. 11 is a cross-sectional view of a retractable projection system according to a third embodiment of the invention when mounted in a ceiling.

The use of the present invention in a ceiling is shown in FIG. 11. There the apparatus 10 not only includes mirrors 16 and 20, but further includes lens 58 that counteracts the optical lenses found in the image generating apparatus so as to keep the total image from dispersing. To produce a final image optical components such as lens 60 are used to display the image. The lenses assist in keeping the image small and enabling the projection apparatus to be of greater length. A further third lens (not shown) positioned at the focal point of lens 58 may be employed to enhance the quality and sharpness of the image. The ratio of the resolving power of the two lenses determines the zooming of the image.

The whole apparatus is mounted within the ceiling 62. It is also to be noted that in this embodiment, the mirror 20 is adapted to rotate away from the image producing apparatus 42, so that the image is effectively transmitted back into the direction of the image producing apparatus 42.

Figure 12:
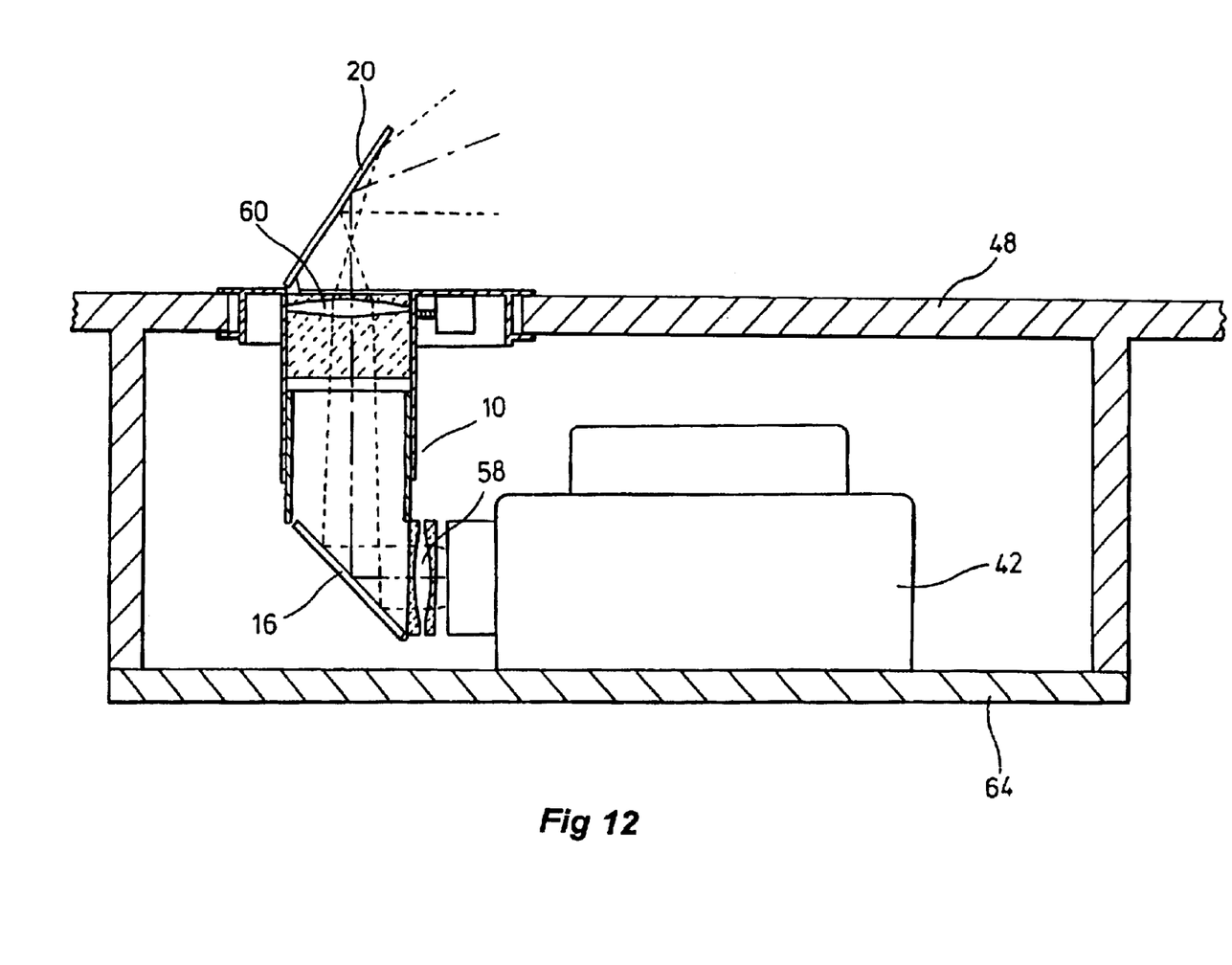
FIG. 12 is a cross-sectional view of a retractable projection or periscope system of FIG. 11 when mounted in a desk.

FIG. 12 illustrates the use of the present invention when mounted in a desk or other office furniture. A shelf 64 is provided in desk 48 that supports the image projection apparatus 42 and the projection apparatus 10. The use of the projection system enables the second mirror to be pivoted out of the surface plane of the desk and enables an image to be projected to a screen in a room. When the image is no longer required, the mirror can be folded downwards providing a clean and unobtrusive desk surface. Even when the mirror is in the open position, the shelf is out of the way and there is no messy equipment and power cords that have to spread on top of the desk.

This one can appreciate that the present invention is for a projecting system or periscope that enables an image producing system to be placed in a cavity or other enclosed space whilst still projecting an image externally. The optical components or the periscope include at least one movable mirror that allows the periscope to be operated between a closed and an open position. In the closed position the mirror is folded to essentially retract the whole system within the cavity thereby leaving essentially no obstructions in the external space.

A retractable tube with suitable lenses so as to reduce the size of the image may be used to move in and out of enclosed space, guided by a photosensor mounted on the projector or periscope to determined when the projector is operating. A standard range of lenses, from 70 mm to 300 mm could be used to match existing commercial projector lenses. Used in a ceiling would greatly suit a LCD type projector for the home and business environment. Use in a desk may suit both the business and the home environment where the projector may be both a slide and image projector. Access to the projector may be via a hatch enabling conventional slides to be used.

Many modifications may be made to the system whilst falling within the scope of the invention. Focussing mechanisms for the lenses may be used as well as various films to manipulate the image. Prisms of front surface mirrors may also be employed to improve on the image. The strength of the lenses may be adjustable to assist in zooming of the image. Various image inverting optics may also be used.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and system.

What is claimed is:

1. An image projecting system for mounting in an enclosed space including: a image producing apparatus adapted to be mounted in a hidden location and adapted to project an image onto a first mirror, said first minor reflecting said image onto a second minor; said second mirror being operatively movable between at least two positions, in a first position substantially reflecting said image to a first location and in a second position reflecting said image to a second location, wherein when said mirror is in said first position, the system is in a stored state and hidden from view.

2. An image projecting system as in claim 1 wherein when in said first position the second mirror reflects the image substantially back to the first mirror.

3. An image projecting system for mounting in a hidden location including an image producing apparatus for producing an image and a plurality of optical components for projecting said image out of said hidden location wherein when in use at least a first optical component extends beyond said hidden location and when not in use all of said optical components are stored within said hidden location to thereby house said system in said hidden location and hide it from view.

4. An image projecting system as in claim 3 wherein said hidden location is a ceiling space.

* * * * *